April 7, 1959 J. J. SKUBAL 2,880,828
GUY WIRE PROTECTOR
Filed Nov. 30, 1956
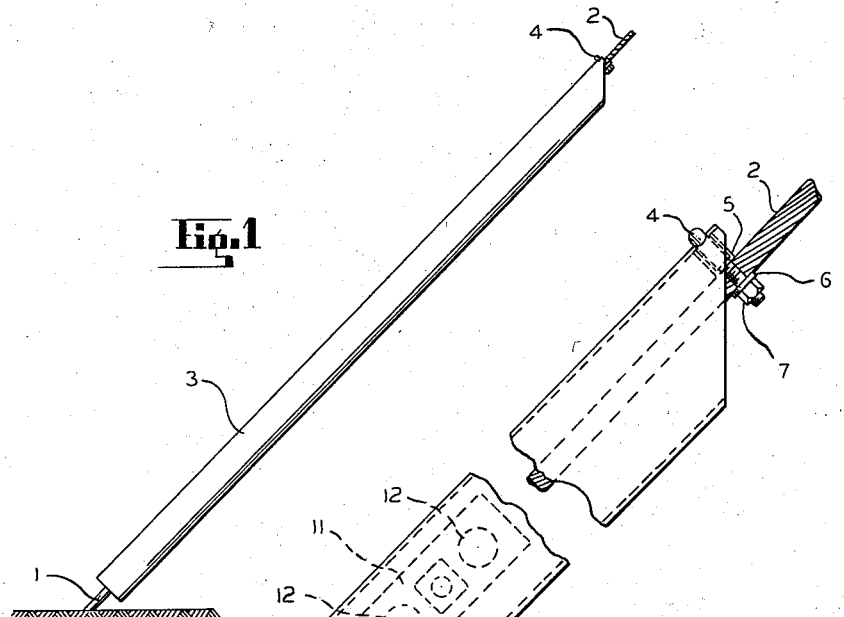
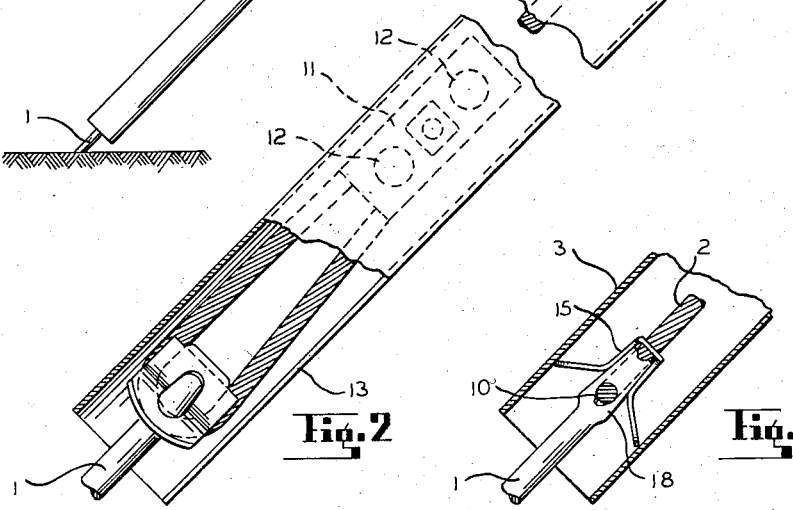
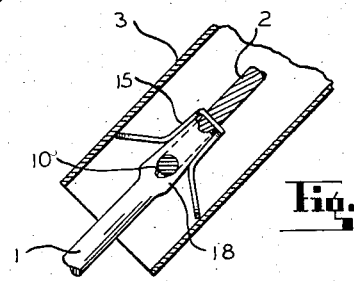
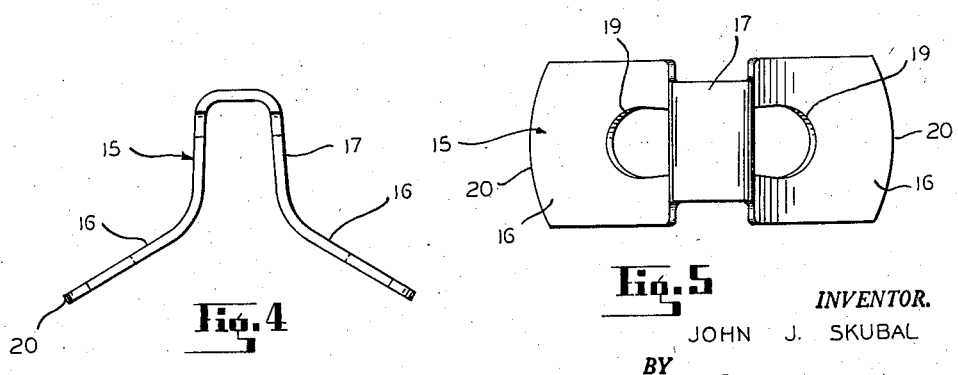
INVENTOR.
JOHN J. SKUBAL
BY
ATTORNEY United States Patent Office 2,880,828
Patented Apr. 7, 1959

2,880,828
GUY WIRE PROTECTOR

John J. Skubal, Milwaukee, Wis., assignor to McGraw-Edison Company, a corporation of Delaware Application November 30, 1956, Serial No. 625,292

6 Claims. (Cl. 189—31.5)

The present invention relates to guy wire protectors, and particularly relates to means for securing such protectors to guy members.

Guy wire protectors, commonly known as "guy guards," have long been used for protection of guy wires of power and communication poles, and the like. In addition, it has long been the intent to protect persons and domesticated animals from harm occurring on contact with protruding guy members, such as bolts, clamp members, etc., and from injury by contact with any protruding or laterally extending free ends of the looped guy strand.

These devices have been satisfactory in operation for the purposes described. However, it has been the general practice to fasten the guy guards, especially at the lower end, with protruding mounting members, or with members having protruding nuts, bolts or rivet portions. It has also been the practice to provide guy guards of semi-circular cross-section for protection of the guy strand, which construction permitted access to the mounting members for placement and removal of the guard. This, however, permitted exposure of certain of the elements of the guy wire structure for likely contact with persons and animals passing thereunder.

Operating practice has indicated that it is most desirable to provide a substantially entirely enclosed guy guard having no protruding elements which might interfere with persons or animals directly contacting the guy wire structure. This is especially true where guy installations are made on property used for confining pedigreed cattle and the like, wherein each animal is identified by tags and chains which are apt to become snagged by clamps, mounting elements, loose "pigtails" of guy strand, or in anchor rod loops. Such installations have proven to be quite an attraction to animals for use in "back-scratching," or as a means for aiding in removal of insects and the like from their bodies.

It will be apparent that a substantially totally enclosed guy guard is an ideal means for protecting the guy members and for protecting persons or animals contacting therewith. However, it will also be apparent that there is considerable difficulty in fastening a guard of this nature directly to the strand without having portions of the mounting elements protruding therefrom, or requiring additional expensive welding procedures. There has been the suggestion of using a tapered guy guard which is wedged downwardly against the looped strand for frictional engagement therewith. However, this poses considerable difficulty in manufacture compared to a nearly cylindrical member which may be simply rolled on a straight mandrel to form.

It is, therefore, an object of the present invention to provide an improved guy wire protector having an imperforate contour substantially throughout its length, and which includes no protruding elements which might interfere with persons or animals brushing against the guard.

Another object of the present invention is to provide an improved mounting means for retaining a guy wire protector in place relative to the guy wire or cable.

It is a further object of the present invention to provide a frictionally, and preferably, wedgingly engageable mounting element for a guy wire guard which element is secured to the guy wire assembly and engageable with the interior surfaces of the guy wire protector for retaining the protector in place relative to the guy strand, and wherein the protector may be substantially enclosed throughout its cross-section.

Other objects and advantages of the invention will become apparent during the course of the following description:

In the drawing, there is shown one embodiment of the invention, wherein:

Fig. 1 is a side elevation showing the device applied to a guy wire structure.

Fig. 2 is an enlarged fragmentary elevational view of the protector, with portions broken away to illustrate the various elements in mounting position.

Fig. 3 is a fragmentary view taken at substantially 90° relative to the lower portion of Fig. 2.

Fig. 4 is a side elevation, in detail, of the mounting wedge member used in securing the guy wire protector.

Fig. 5 is a top plan view of the wedge member.

Referring to Figs. 1 and 2 of the drawing, a guy assembly, such as employed to take the lateral thrust imposed on power and communication poles and the like (not shown), is illustrated as comprising the usual anchor rod 1 extending from a ground anchor (not shown) buried underground, and the guy wire 2. The improved guy wire protector, or guard, is indicated by the reference numeral 3. The protector or guard 3 is fastened at its upper end by means of a conventional U-bolt 4 threaded through spaced apertures in the guard 3, and including a spacer member 5 for maintaining the guard in spaced relationship from the guy strand on wire 2. A keeper plate 6 having spaced apertures is received by the U-bolt legs and fastened in place by means of conventional clamping nuts 7 to embracingly engage the guy wire 2 between the plate 6 and the spacer member 5.

It is to be noted that guard 3 is smooth along both its external and internal surfaces, and that the U-bolt 4 is the only member protruding from the surface of the protector 3. This bolt is relatively elevated from ground level where it will not interfere with persons or animals contacting therewith.

The present invention in no way interferes with the usual practice of fastening the guy wire or strand 2 directly to the anchor rod 1. That is, it is conventional practice to provide an anchor rod having a thru-hole or aperture 10 (see Fig. 3) and laterally spaced grooves terminating in the aperture for receiving the looped end of the wire 2. The free end of the looped guy wire is conventionally secured to the supporting portion by means of a parallel groove clamp 11 having opposed members urged towards clamping engagement with the wire 2 by means of clamping nuts and bolts 12.

It will be apparent that it is preferred to provide a substantially totally enclosed guy wire protector, shown in detail in Fig. 2. That is, the protector may be made of sheet metal rolled to form a substantially circular cross-section and having its edges 13 brought into substantial alignment with one another in butting relationship. However, if it is desired to provide a guy guard with its longitudinal edges in spaced apart relationship, the present invention will also be applicable thereto.

The wedging member 15 is preferably formed from sheet material in a general U-shape, as shown in Fig. 4, and having its leg portions 16 bent outwardly in opposed relationshipship relative to one another to provide a resilient means for frictionally engaging diametrically opposed internal wall surfaces of the protectors 3. The leg portions 16 are preferably formed to permit ease in insertion of the guard towards a downward direction relative to the anchor rod 1, and to provide wedging resistance towards removal in an upward direction relative to the rod. The bail portion 17 of the member 15 is preferably, though not necessarily, provided with a contour conforming to the contour of the opposed surfaces of the anchor rod head 18 (see Fig. 3). The wedging member 15 is also preferably pierced out at either leg to provide the apertures 19 in order to provide a relatively resilient structure. It will be understood that the wedging member may be adapted for engagement with the guy wire or may be clamped directly to the guy wire and/or anchor rod by means of bolted portions (not shown), if so desired.

In practice, the guy wire 2 is fastened in place by looping the lower end through the anchor rod eyelet or aperture 10 and securing the same by means of a parallel groove clamp 11 after being brought to the desired tension. The wedging member 15 is then inserted in the loop of the guy wire above the anchor rod 1 and oriented to the position shown in Figs. 2 and 3, being preferably forced down upon the head of the anchor rod to be retained in position for subsequent placement of the guy guard 3. The guy guard 3 is next slipped over the guy wire 2 through its longitudinal slot provided by the relationship of the butted edges 13. The guard may be slightly sprung apart for insertion over the wire 2, if necessary. It will then retain its position, by reason of its inherent resiliency, to provide close alignment of the butted edges. The guard is then forced downwardly relative to the anchor rod 1 with the wedging member frictionally engaging the internal surfaces of the guard at the extremities 20 of its leg portions 16 as shown in Fig. 3. After the guard has been brought to the preferred position, the U-bolt 4 is slipped through the apertures of the guard with the spacer member 5 resting on the guy wire. The keeper member 6 is then inserted and fastened in place by means of the nuts 7.

It will be apparent that the complete assembly, especially as shown in Figs. 1 and 2, will provide a neat and smooth appearing guy wire protector installation, wherein no portions of a guy guard, anchor rod, or any other mounting member will protrude therefrom to cause harm to persons or animals contacting therewith, and further such structure will provide, in its preferred form, a substantially totally enclosed assembly wherein identification tags on animals, or clothing of persons will not catch on any portion thereof.

The term "wedging" as used in the present description and appended claims is intended to be considered in its broadest sense. For instance, "wedging engagement" between the wedging member 15 and the internal surface of the guard 3 is intended to include not only direct frictional engagement between the members, but would also encompass abutting contact between the extremities 20 and inwardly lanced tabs (not shown) or inwardly or outwardly projecting embossments (not shown) provided by bead rolling or other forming methods. Thus, the resilient wedging member will resist longitudinal movement of the guard in a selected direction established by the position of the tabs or beading.

I claim:

1. The combination with a guy wire structure including a guy wire, an anchor having an anchor rod portion extending therefrom, and clamping means connecting the guy wire to the anchor rod portion, of an elongated longitudinally recessed guy guard arranged over the guy wire structure, and a mounting member engaging said anchor rod portion and secured to said guy wire structure and including a portion frictionally engaging the internal surface of said guy guard irrespective of the radial and longitudinal positions of said guy guard relative to said mounting member.

2. The combination with a guy wire structure including a guy wire, an anchor having an anchor rod portion extending therefrom, and clamping means connecting the guy wire to the anchor rod portion, of an elongated longitudinally recessed guy guard disposed over the guy wire structure, and a wedging member engaging said anchor rod portion and secured to said guy wire structure and including a resilient portion biased towards wedging engagement with the internal surface of said guy guard, said engagement being independent of the position of said guy guard relative to said wedging member.

3. In a guy wire structure including a guy wire, an anchor having an anchor rod portion extending therefrom, and clamping means connecting the guy wire to the anchor rod portion, the combination of an elongated longitudinally recessed guy guard arranged over the guy wire structure, and a wedging member secured to said guy wire structure and including opposed resilient leg portions extending laterally outwardly relative thereto and wedgingly engaging the internal surface of said longitudinally recessed guy guard irrespective of the position of said guy guard relative to said wedging member.

4. In combination with a guy wire structure including a guy wire, an anchor having an anchor rod portion extending therefrom, and clamping means connecting the guy wire to the anchor rod portion, an elongated longitudinally recessed guy guard disposed surroundingly to the guy wire structure, and a wedging member secured to said guy wire structure and having opposed resilient portions extending laterally outward relative thereto and wedgingly engaging the internal surface of said guy guard independent of the position of said guy guard relative to said wedging member, said longitudinally recessed guy guard being longitudinally movable in one direction past said wedging member and said opposed resilient portions wedging against said internal surface of said guard and preventing longitudinal movement thereof in the opposite direction.

5. The combination with a guy wire structure including a guy wire, an anchor having anchor rod portion extending therefrom, and clamping means connecting the guy wire to the anchor rod portion, of an elongated longitudinally recessed guy guard arranged over the guy wire structure, and a U-shaped wedging member secured to said guy wire structure and having a bail portion and a pair of resilient integral leg portions, said leg portions being bent laterally outwardly relative to one another, the extremities of said leg portions wedgingly engaging the internal surface of said guy guard independent of the position of said guy guard relative to said wedging member and preventing longitudinal movement of said guy guard in one direction.

6. The combination with a guy wire structure including a guy wire, an anchor having a headed anchor rod portion extending therefrom, and clamping means connecting the guy wire to the headed anchor rod portion, of an elongated longitudinally recessed guy guard arranged over the guy wire structure, and a U-shaped wedging member having a bail portion and a pair of resilient integral leg portions, said leg portions being bent laterally outwardly relative to one another, said bail portion frictionally embracing the head of said anchor rod portion and the extremities of said leg portions wedgingly engaging the internal surface of said guy guard.

References Cited in the file of this patent

UNITED STATES PATENTS

| | | |
|---|---|---|
| 1,452,993 | Wack | Apr. 24, 1923 |
| 1,709,556 | Blackburn | Apr. 16, 1929 |
| 1,800,109 | Selig | Apr. 7, 1931 |
| 2,061,307 | Hocher et al. | Nov. 17, 1936 |